United States Patent [19]

Fujimoto

[11] Patent Number: 5,373,369

[45] Date of Patent: Dec. 13, 1994

[54] INFORMATION SIGNAL RECORDING AND REPRODUCING APPARATUS

[75] Inventor: Ryo Fujimoto, Kanagawa, Japan

[73] Assignee: Canon Kabushiki Kaisha, Tokyo, Japan

[21] Appl. No.: 187,795

[22] Filed: Jan. 26, 1994

Related U.S. Application Data

[60] Continuation of Ser. No. 883,188, May 15, 1992, abandoned, which is a division of Ser. No. 235,091, Aug. 22, 1988, Pat. No. 5,162,920.

[51] Int. Cl.$^5$ .............................................. H04N 5/95
[52] U.S. Cl. .................................... 358/337; 358/320; 358/327
[58] Field of Search ............... 358/337, 335, 323, 321, 358/327, 320, 319, 310, 330, 906; 348/499, 497, 475, 476, 477

[56] References Cited

U.S. PATENT DOCUMENTS

| | | | |
|---|---|---|---|
| 4,626,911 | 12/1986 | Sasaki et al. | 358/141 |
| 4,663,674 | 5/1987 | Osawa | 360/14.1 |
| 4,841,379 | 6/1989 | Akiyama | 358/337 |
| 4,959,825 | 9/1990 | Okano | 369/48 |

Primary Examiner—Tommy P. Chin
Assistant Examiner—Robert Chevalier
Attorney, Agent, or Firm—Robin, Blecker, Daley & Driscoll

[57] ABSTRACT

An information signal reproducing apparatus for reproducing an information signal from a recording medium on which is recorded the information signal including a first information signal, which is formed by modulating a part of a period of a single frequency signal with information and not modulating the other part of the period of the single frequency signal and a second information signal, which is different from the first information signal, comprises a reproducing unit for reproducing the first information signal and the second information signal from the recording medium and outputting the reproduced signals, correcting apparatus for performing correction of time-base variations on the second information signal reproduced by the reproducing unit, and a correction controller for controlling a correction operation performed by correction device, by using the other part of the period which is not modulated with the information among the signal frequency signal of the first information signal output from reproducing apparatus.

10 Claims, 3 Drawing Sheets

INFORMATION SIGNAL RECORDING AND REPRODUCING APPARATUS

This is a continuation application under 37 CFR 1.62 of prior application Ser. No. 883,188, filed May 15, 1992, now abandoned, which application is a division of application Ser. No. 235,091, filed Aug. 22, 1988, U.S. Pat. No. 5,162,920.

BACKGROUND OF THE INVENTION

1. Field of the Invention

The present invention relates to an information signal recording and reproducing apparatus for recording an information signal on a recording medium and for reproducing the information signal recorded on the recording medium.

2. Description of the Related Art

When a picture signal representing a still picture or a moving picture which is recorded on a magnetic recording medium or an optical recording medium as an information signal is reproduced therefrom, time-base variations may be generated in the reproduced signal. The effect of these time-base variations is the reproduction, for example, of an image representing a straight vertical bar as an image representing a deformed one. Conventionally, solution to the time-base variations problem has been found in the time-base variations correction technique in which the time-base correction is performed on the reproduced signal on the basis of a burst signal which has been added to the picture signal as a reference signal and the time-base correction technique in which the time-base correction is performed using a constant frequency signal for use in time-base correction which is multiplexed with the image signal on a frequency basis when it is recorded on the recording medium.

However, the former correction technique which employs a burst signal has a disadvantage in that stable correction is difficult when the variations such as jitter or skew are large, and that a large-scale structure is required in order to stabilize the time-base correction, increasing production cost. In the latter technique for recording a picture signal which is multiplexed with the constant frequency signal on a frequency basis, cross modulation between the constant frequency signal and the picture signal may occur, deteriorating the original picture signal.

In recent years, still video systems have been developed in which a frequency-modulated still picture signal is recorded on a 2-inch magnetic disk.

FIG. 3 shows the frequency allocation for a still picture signal recorded on the magnetic disk in the above-described still video system. As can be observed in the figure, in the still video system, the still picture signal recorded on the magnetic disk includes a luminance signal containing a synchronization signal (shown as (Y+S) in FIG. 3) which is frequency-modulated such that the tip of sync and the peak white thereof respectively produce 6 MHz and 7.5 MHz, a color-difference line-sequential signal which is frequency-modulated in the vicinity of 1 MHz (shown as (C) in the figure), and an ID (INDEX) signal which has a carrier having a frequency of about 200 KHz (accurately, 13 fH, where fH represents a horizontal synchronizing frequency) digital-modulated so that it can identify a data or a track number, these signals being multiplexed with each other on a frequency basis when they are recorded on the magnetic disk. Combination of electrical signals on a frequency basis may generate cross modulation among the respective signals. However, practically perfect recording of images is possible by the adjustment of the magnitude of a recording current of a signal and the frequency level thereof.

Thus, in the current still video system, since the luminance signal and the color-difference line-sequential signal are recorded on the magnetic disk in a state wherein they are separated on a frequency basis, as shown in FIG. 3, no burst signal is added to the luminance signal. Therefore, only the horizontal synchronizing signal (H-SYNC) having a frequency of 15.75 KHz which is added to the luminance signal can be used as a reference signal for the time-base correction conducted when the picture signal is reproduced.

However, the still video system employs as a recording medium a 2-inch magnetic disk which has a small inertial mass and which generates large jitter variations. Further, in the rotary system used for recording and reproduction, a PG pulse signal generated for each revolution of the rotary system is synchronized in phase with a vertical synchronizing signal (V-SYNC) by a phase locked loop, thereby generating large skew variations. These factors make the time-base correction utilizing the horizontal synchronizing signal insufficient.

Accordingly, a burst signal may be added to the luminance signal so as to enable accurate time-base correction to be performed when the video signal is reproduced. However, as has been stated previously, since the still video system has large variations of skew and jitter, a stable time-base correction is impossible. In order to achieve a sufficiently stable time-base correction, a large-scale structure is necessary.

Alternatively, a time-base correction employing a constant frequency signal which is multiplexed with the picture signal on a frequency basis may be performed. However, three types of signal have already been combined to form a picture signal, as shown in FIG. 3, and superimposition of a constant frequency signal may increase the possibility of cross modulation occurring, deterioration the picture signal.

SUMMARY OF THE INVENTION

An object of the present invention is to provide an information signal recording and reproducing apparatus which enables the above-described problems of the prior art to be eliminated.

Another object of the present invention is to provide a signal information recording apparatus which is capable of recording an information signal on a recording medium in such a way that, when the information signal is reproduced from the recording medium, time base variations generated in the reproduced information signal can be readily corrected without using a special signal.

To achieve the above-described objects, the present invention provides, in one of its aspects, an information signal recording apparatus for recording on a recording medium a signal which includes a first information signal and a second information signal which differs from the first information signal, which comprises:

- constant frequency signal generating means for continuously generating a signal having a constant frequency;
- first information signal forming means for inputting the constant frequency signal which is continuously generated by the constant frequency signal generating means and for outputting the first information signal obtained by modulating the input constant frequency signal during a first period and outputting the input constant frequency signal as it is during a second period which differs from the first period; and recording means for inputting the second information signal and the signals which have been output from the first information signal forming means and for recording on the recording medium a signal obtained by multiplexing the second information signal with the signals on a frequency basis.

Another object of the present invention is to provide an information signal reproducing apparatus which enables the time base variations generated in the information signal reproduced from the recording medium to be eliminated without deteriorating the information signal.

The present invention provides, in another of its aspects, an information signal reproducing apparatus for reproducing a first information signal and a second information signal which differs from the first information signal from a recording medium on which a signal including the first information signal and the second information signal is recorded, which comprises:

reproducing means for reproducing from the recording medium the first information signal formed to have a constant frequency signal portion during part of a period thereof and the second information signal which differs from the first information signal;

correction means for performing correction of time base variations on the second information signal reproduced by the reproducing means; and correction operation control means for controlling a correction operation performed by the correction means by using the constant frequency signal portion in the first information signal reproduced by the reproducing means.

Other objects and features of the present invention will become apparent from the following description of the preferred embodiment thereof, taken in conjunction with the accompanying drawings.

DETAILED DESCRIPTION OF THE PREFERRED EMBODIMENTS

Figure 1:
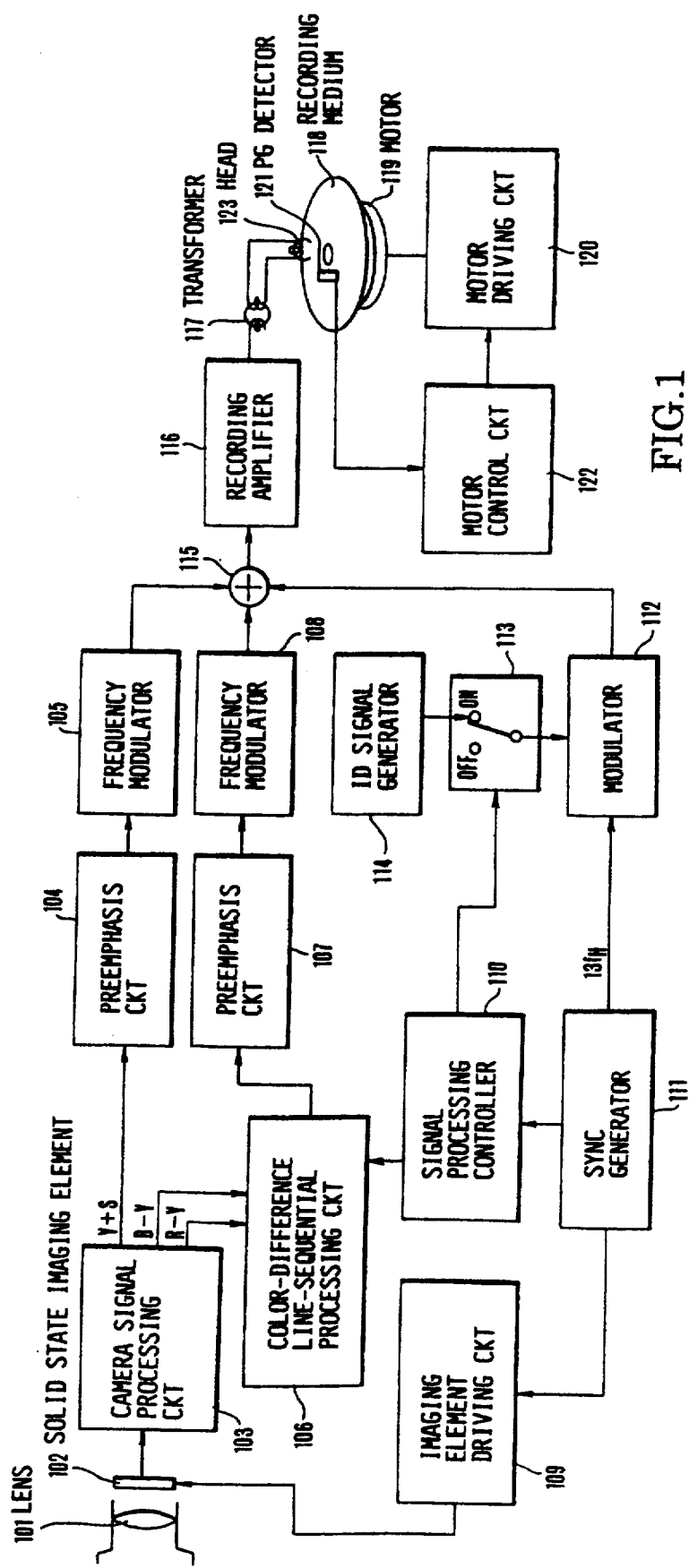
FIG. 1 is a block diagram of a recording system for a still video apparatus, showing an embodiment of the present invention.
Figure 2:
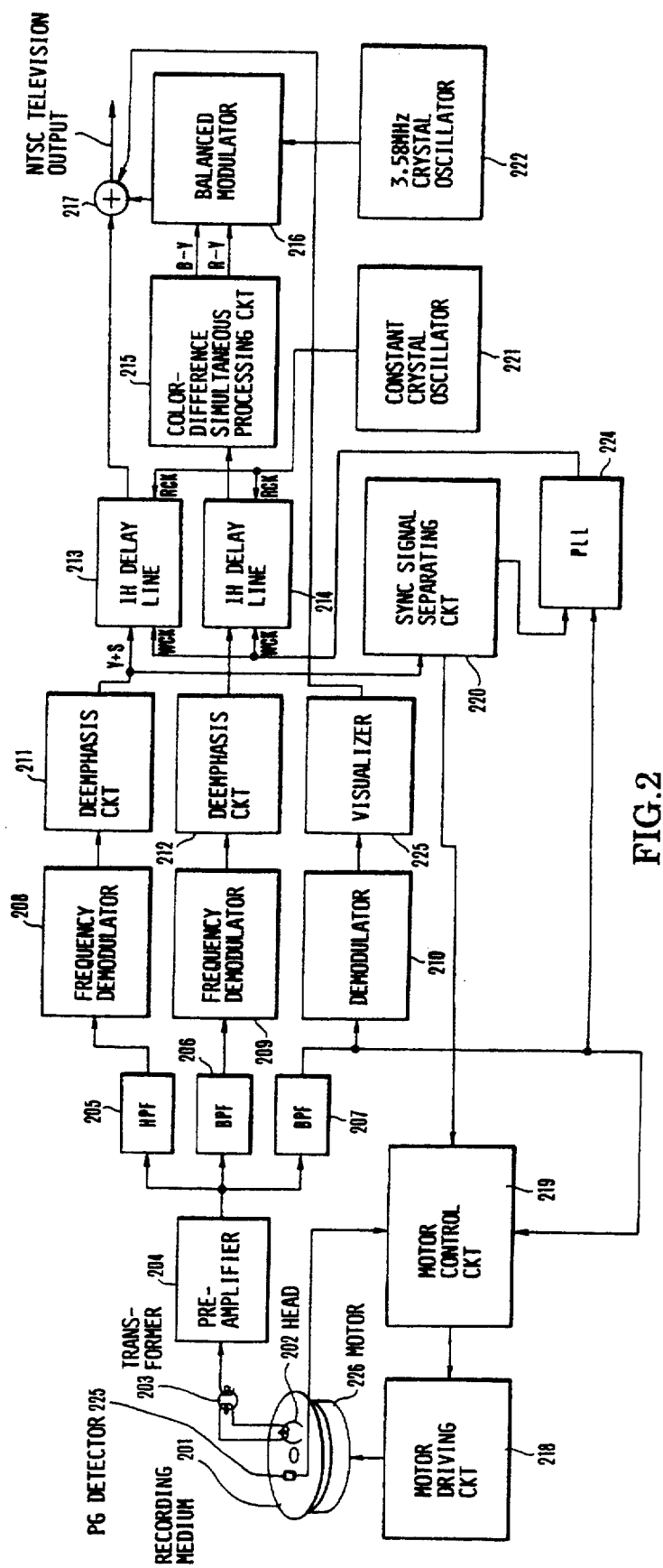
FIG. 2 is a block diagram of a reproducing system for the still video apparatus of FIG. 1.
Figure 3:
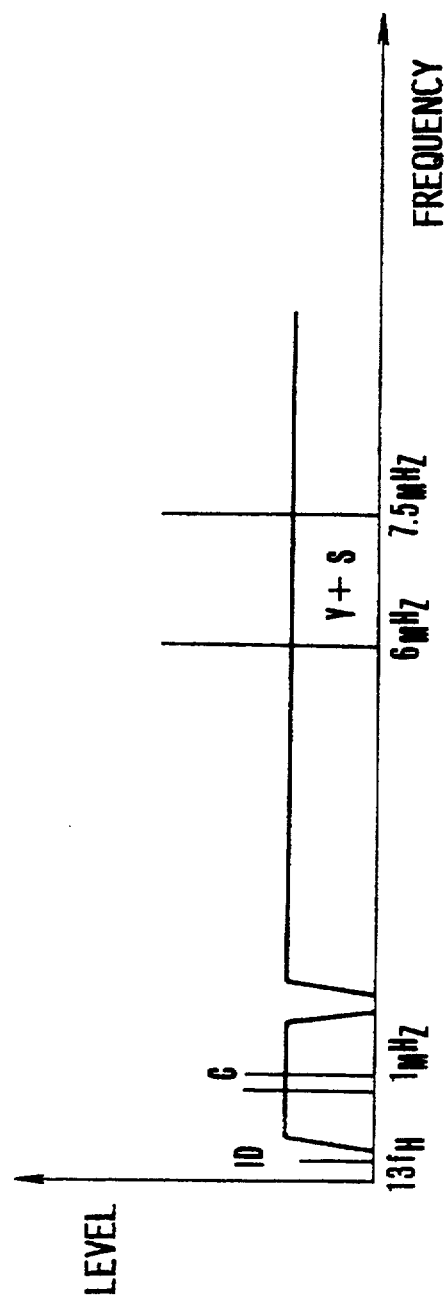
FIG. 3 is a view showing the frequency allocation used when a signal is recorded in a still video format.

The present invention will be described below by way of example with reference to the accompanying drawings in which FIG. 1 is a block diagram of a recording system for a still video apparatus, and FIG. 2 is a block diagram of a reproducing system for the still video apparatus of FIG. 1.

Referring first to FIG. 1, a recording system for a still video apparatus will be described first.

In FIG. 1, the recording system includes: a lens 101 for forming an optical image of an object; and a solid state imaging element 102, such as a charge coupled device, for converting the optical image formed on the imaging plane by the lens 101 to an electric signal.

The recording system also includes: a camera signal processing circuit 103 for processing a signal, e.g., for forming from R (red), G (green) and B (blue) color signals obtained from the solid state imaging element 102 a luminance signal added with a synchronizing signal (Y+S) as well as two types of color-difference signal (R−Y, B−Y); a preemphasis circuit 104 for applying pre-emphasis to the luminance signal (Y+S) added with the synchronizing signal which has been output from the camera signal processing circuit 103; and a frequency modulator 105 for converting the output signal of the preemphasis circuit 104 to a frequency-modulated signal and for outputting the resultant signal.

Also included in the recording system are: a color-difference line-sequential processing circuit 106 for converting the B−Y signal and the R−Y signal which have been output from the camera signal processing circuit 103 to a color-difference line-sequential signal; a preemphasis circuit 107 for applying pre-emphasis to the output signal of the color-difference line-sequential processing circuit 106; and a frequency modulator 108 for converting the output signal of the preemphasis circuit 107 to a frequency-modulated signal and for outputting the modulated signal.

Other components of the recording system are: an imaging element driving circuit 109 for driving the solid state imaging element 102; a signal processing controller 110 for outputting a control signal to the color-difference line-sequential processing circuit 106 and to a switch 113 which is to be described later; and a synchronizing signal generator 111 for outputting a synchronizing signal to the imaging element driving circuit 109, the signal processing controller 110, and to a modulator 112 which is to be described later.

An ID signal generator 114 for generating an ID signal is connected to an ON terminal of the switch 113, as shown in FIG. 1. The contact of the switch 113 is connected to an OFF terminal shown in FIG. 1 by the control signal output form the signal processing controller 110 during the time in which a video signal exists, whereas it is connected to the ON terminal shown in FIG. 1 during the time in which no video signal exists before and after a vertical synchronizing signal is generated. While the contact of the switch 113 is being connected to the ON terminal shown in FIG. 1 by the above-described switching-over operation, the ID signal output from the ID signal generator 114 is supplied to the modulator 112 via the switch 113 where it modulates a constant frequency signal of 13 fH and outputs a modulated signal.

An adder 115 is adapted to add the outputs from the frequency modulators 105 and 108 and the modulator 112 and thereby form a signal to be recorded. The signal which is output from the adder 115 is amplified by a recording amplifier 116, and is then fed to a recording head 123 via a transformer 117 where it is recorded on a disk-shaped recording medium 118 which is rotating at a constant speed by the drive of a motor 119. The motor 119 is driven by a motor driving circuit 120. A motor control circuit 122 controls the motor driving circuit 120 such that the motor 119 rotates the recording medium 118 at a constant speed in accordance with a PG signal output from a PG detector 121 for detecting a rotation reference position (not shown) provided on the recording medium 118 and for generating a PG signal.

Next, a reproducing system for the still video apparatus will be described with reference to FIG. 2.

The reproducing system includes: a disk-shaped recording medium 201; a motor 226 for rotating the recording medium 201; a motor driving circuit 218 for driving the motor 226; a motor control circuit 219 for controlling the motor driving circuit 218 such that the motor 226 rotates the recording medium 210 at a constant speed; a PG detector 225 for detecting the rotation reference position (not shown) provided on the recording medium 201 and generating a PG signal; and a head 202 for reproducing a video signal recorded on the recording medium 201, the output from the head 202 being fed to a preamplifier 204 via a transformer 203.

The reproducing system also includes: a HPF (a high-pass filter) 205; BPFs 206 and 207 (band-pass filters), the output of the preamplifier 204 being fed to the HPF 205 and the BPFs 206 and 207; a frequency demodulator 208 for frequency-demodulating the output of the HPF 205; a frequency demodulator 209 for frequency-demodulating the output of the BPF 206; a demodulator 210 for demodulating the output of the BPF 207; a de-emphasis circuit 211 for de-emphasizing the signal output from the frequency demodulator 208; a de-emphasis circuit 212 for de-emphasizing the signal output from the frequency demodulator 209; and a visualizer 225 for forming a video signal from the output of the demodulator 210.

Also included in the reproducing system are: 1H delay lines 213 and 214 for respectively delaying the output signals from the de-emphasis circuits 211 and 212 by one horizontal synchronizing period (1H); a color-difference simultaneous processing circuit 215 for color-difference simultaneous processing of the output signal from the 1H delay line 214; a balanced modulator 216 for performing a balanced modulation on the B−Y signal and the R−Y signal which have been output from the color-difference simultaneous processing circuit 215; and an adder 217 for adding the outputs from the 1H delay line 213, the balanced modulator 216, and the visualizer 225 and for outputting a television signal for use in the NTSC system.

A synchronizing signal separating circuit 220 is adapted to separate a synchronizing signal from Y+S signal which is supplied from the de-emphasis circuit 211. The synchronizing signal separated is fed to the motor control circuit 219 and a PLL (phase locked loop) circuit 224. The reproducing system also includes: the PLL circuit 224 for outputting a write clock signal (WCK) to the 1H delay lines 213 and 214, respectively; a constant crystal oscillator 221 for outputting a read clock signal (RCK) having a constant frequency to the 1H delay lines 213 and 214; and a crystal oscillator 222 for outputting a carrier wave having a frequency of 3.58 MHz to the balanced modulator 216.

Now, the recording operation performed by the still video apparatus of the present invention will be described with reference to FIG. 1.

A video signal obtained by the solid state imaging element 102 is converted to Y+S, R−Y, and B−Y signals by the camera signal processing circuit 103. Preemphasis is applied to the luminance signal Y+S by the preemphasis circuit 104. The resulting signal is converted to a frequency-modulated signal by the frequency modulator 105, and is then supplied to the adder 115. The R−Y and B−Y signals are converted by the color-difference line-sequential processing circuit 106 to a color-difference line-sequential signal in which the R−Y signal and the B−Y signal appear alternately for each horizontal synchronizing period. After preemphasis has been applied to the color-difference line-sequential signal by the preemphasis circuit 107, a resultant signal is frequency-modulated by the frequency modulator 108, and is then supplied to the adder 115.

A signal having a frequency of 13 fH is continuously output from the synchronizing signal generator 111 to the modulator 112. The contact of the switch 113 is connected to the OFF terminal shown in FIG. 1 by the control signal from the signal processing controller 110 during the time in which a video signal is present, allowing the signal having a frequency of 13 fH to be supplied to the adder 115 without being modulated by the modulator 112.

During the time in which no video signal exists before and after a vertical synchronizing signal is generated, the contact of the switch 113 is connected to the ON terminal shown in FIG. 1 by the control signal from the signal processing controller 110. Therefore, the signal having a frequency of 13 fH is modulated by the modulator 112 with the ID signal generated by the ID signal generator 114, and a modulated signal 13 fH is supplied to the adder 115.

The output of the adder 115 is amplified by the recording amplifier 116, and the amplified signal is fed to the head 123 via the transformer 117 where it is recorded on the recording medium 118.

Thus, in this embodiment, since the connected state of the switch 113 is switched over by the control of the signal processing controller 110, the signal having a constant frequency of 13 fH which is continuously generated by the synchronizing signal generator 111 is supplied to the adder 115 without being modulated as a reference signal for time base correction during the time in which a video signal is present, where it is multiplexed with a recording signal on a frequency basis, the resultant signal being recorded on the recording medium 118. On the other hand, during the time in which no video signal is present before and after the vertical synchronizing signal is generated, the signal 13 fH is modulated by the modulator 112 in accordance with the ID signal generated from the ID signal generator 114, the modulated signal 13 fH being multiplexed with a recording signal on a frequency basis in the adder 115, and the resultant signal being recorded on the recording medium 118.

Next, the operation of the reproducing system of the still video apparatus according to the present invention will be described below with reference to FIG. 2.

The video signal recorded on the recording medium 201 is reproduced by the head 201, and the reproduced signal is fed to the preamplifier 204 via the transformer 203 where it is amplified. A frequency-modulated luminance signal Y+S is separated from the video signal which has been amplified by the preamplifier 204 by the HPF 205, and the separated Y+S signal is frequency-demodulated by the frequency demodulator 208, and is then de-emphasized by the de-emphasis circuit 211 so as to form a Y+S signal. A frequency-modulated color-difference line-sequential signal is separated from the output of the preamplifier 204 by the BPF 206. The separated color-difference line-sequential signal is frequency-demodulated by the frequency demodulator 209, and is then de-emphasized by the de-emphasis circuit 212 so as to form a color-difference line-sequential signal. A signal 13 fH having a portion modulated by the ID signal and a non-modulated portion is separated from the output of the preamplifier 204 by the BPF 207, and the separated signal 13 fH is supplied to the demodulator 210, the PLL circuit 224, and the motor control circuit 219.

In the demodulator 210, the portion of the signal 13 fH which has been modulated by the ID signal is demodulated, and a demodulated signal is converted by the visualizer 225 including various types of logic circuit and a memory to a character video signal which identifies the characters to be inserted on the screen. The resulting character video signal is supplied to the adder 217. In addition to the signal 13 fH, a vertical synchronizing signal and a horizontal synchronizing signal which are separated from the Y+S signal by the synchronizing signal separating circuit 220 and a PG signal which is output from the PG detector 225 are supplied to the motor control circuit 219. The motor control circuit 219 controls the motor driving circuit 218 on the basis of the vertical synchronizing signal, the horizontal synchronizing signal, the PG signal, and the signal 13 fH, such that the motor driving circuit 218 rotates the motor 226 in such a way that the vertical synchronizing signal and the horizontal synchronizing signal have a predetermined phase relationship with that of the PG signal. In this embodiment, the rotation of the motor 226 is also controlled such that the frequency and the phase of the portion of the signal 13 fH which has not been modulated by the ID signal become stable. These result in a highly accurate control of the rotation of the motor 226.

After the stable rotation of the motor 226 has been attained, the time base variations generated in the luminance signal Y+S and the color-difference line-sequential signal respectively output from the de-emphasis circuit 211 and the de-emphasis circuit 212 are corrected by a TBC circuit which consists of the 1H delay lines 213 and 214, the constant crystal oscillator 221, and the PLL circuit 224. The TBC circuit is operated in the manner described below.

The horizontal synchronizing signal which has been separated from the luminance signal Y+S by the synchronizing signal separating circuit 220 and the signal 13 fH which has been separated by the BPF 207 are supplied to the PLL circuit 224. The PLL circuit 224 includes a voltage controlled oscillator (VCO) for generating a clock signal having a frequency of 4 fsc (where fsc represents the carrier frequency). The 4 fsc clock signal generated from the voltage controlled oscillator is output to the 1H delay lines 213 and 214 as a write clock signal (WCK). At this time, the PLL circuit 224 forms the fH and 13 fH signals by frequency-dividing the clock signal of 4 fsc output from the voltage controlled oscillator, compares the phases of the horizontal synchronizing signal which has been supplied from the synchronizing signal separating circuit 220 and a portion of the signal 13 fH supplied from the BPF 207 which has not been modulated by the ID signal with the phases of the fH and 13 fH signals, and controls the phase of the clock signal having a frequency of 4 fsc which is output from the voltage controlled oscillator in accordance with the phase difference between these signals, so that the clock signal having a frequency of 4 fsc is synchronized in phase with the horizontal synchronizing signal and the signal 13 fH which have been separated from the reproduced signal.

The luminance signal Y+S and the color-difference line-sequential signal are written in the 1H delay lines 213 and 214, respectively, on the basis of the clock signal obtained from the PLL circuit 224 in the manner described above, and the luminance signal Y+S and the color-difference line-sequential signal which have been respectively stored in the 1H delay lines 213 and 214 are read out therefrom by a clock signal having constant frequency of 4 fsc which is supplied from the constant crystal oscillator 221 as a read clock signal (RCK), by which the time base variations which have occurred in the luminance signal Y+S and the color-difference line-sequential signal are corrected. The luminance signal Y+S whose time base variations have been corrected is supplied to the adder 217, while the time base corrected color-difference line-sequential signal is supplied to the color-difference simultaneous processing circuit 215 where the color-difference line-sequential signal is converted into simultaneous color-difference signals. The simultaneous R−Y signal and the B−Y signal are quadrature two-phase balanced modulated at 3.58 MHz (fsc) by the balanced modulator 216 so as to form a carrier chrominance signal, and the resultant carrier chrominance signal is supplied to the adder 217. Thus, the luminance signal Y+S, the carrier chrominance signal, and the character video signal are supplied to the adder 217 where they are multiplexed with each other on a frequency basis so as to obtain a television signal with the character image identifying a date or a track number added thereto for use in the NTSC system.

Now, the accuracy with which correction of the time base variations is carried out by the TBC circuit employing the above-described PLL circuit 224 will be examined.

Assume that the time base variation tolerance is 5 nsec. This represents 6 degrees in terms of angle of rotation. Although the time base variations of 5 nsec may not be small enough, they only produce an extremely small degree of distortion on the screen in this system, which is practically negligible, because the luminance signal and the chrominance signal are recorded on the recording medium in a state wherein they are separated from each other on a frequency basis and because the R−Y signal and the B−Y signal are alternately recorded for each horizontal synchronizing period as the color-difference line-sequential signal. The time base variations of 5 nsec correspond to about 5 nsec/50 μsec (effective horizontal scanning period)×50 cm=0.05 mm on a screen having a width of 50 cm, which is small enough to be neglected.

In order to provide a TBC circuit utilizing a horizontal synchronizing signal having a frequency fH of 15.75 kHz which ensures the time base variations of 5 nsec, an accuracy expressed by the following equation is required.

$$5 \text{ nsec}/\frac{1}{15.75 \times 10^3} \approx 8 \times 10^{-5}$$

In other words, the required accuracy is 0.008%, which is too high a value to be provided by a simple PLL circuit. On the other hand, a TBC circuit which utilizes 13 fH≈200 kHz requires an accuracy expressed by the following equation.

$$5 \text{ nsec}/\frac{1}{200 \times 10^3} \approx 0.001$$

In other words, the required accuracy is only 0.1%, which is low enough to be provided by a simple PLL circuit.

The signal 13 fH is pulled into the PLL circuit during the first several H (horizontal synchronizing) periods after a vertical synchronizing signal has been output in this system. Since these periods represent the outside of the effective area of picture which is not displayed on the monitor screen, no problem occurs in an actual operation. In consequence, a PLL circuit which is highly accurate and highly responsive in terms of pulling time is not required, enabling a highly accurate TBC circuit to be provided using a very simple PLL circuit.

The present embodiment employs as a reference signal for the TBC circuit the signal 13 fH which has been recorded on the recording medium 201. Therefore, cross modulation between the signal 13 fH and other signals such as the luminance signal or the color-difference line-sequential signal, and hence deterioration of the image quality, does not occur. Further, the signal 13 fH is modulated by the ID signal only during the time before and after a vertical synchronizing period in which the information representing a date or a track number is multiplexed, and a portion of the signal 13 fH which has not been modulated by the ID signal is used as a reference signal for time base correction, causing no problem.

The TBC circuit in the above-described embodiment uses the 1H delay lines 213 and 214 which store an image signal for one horizontal scanning line. However, the capacity of a delay line can be varied in accordance with the generated time base variations, and a delay line which stores an image signal for one field, one frame, or half of one horizontal scanning line may also be employed. Suitable delay lines also include an analog delay line such as CCD and a digital memory into which a digital signal is stored.

The PLL circuit may not be supplied with the horizontal synchronizing signal. If time base correction is performed in the TBC circuit after the television signal for use in the NTSC system has been provided, only one delay line is necessary, making the structure of the system simpler.

In the reproducing system of the still video apparatus which is shown in FIG. 2, the motor is controlled with a high degree of accuracy using both of the signal fH and the signal 13 fH. However, since time base correction is conducted in this embodiment, it is not necessary for the motor control to be highly accurate, and either signal fH or signal 13 fH may be employed to perform the motor control.

As will be understood from the foregoing description, in the information signal recording and reproducing apparatus according to the present invention, the information signal can be recorded on the recording medium without deteriorating information which is caused by the multiplexing of the information signals on a frequency basis. Further, stable and highly accurate time base correction is possible when the signal is reproduced.

What is claimed is:

1. An information signal reproducing apparatus for reproducing an information signal from a recording medium on which is recorded said information signal including a first information signal which is formed by modulating a part of a period of a single frequency signal with information and not modulating the other part of the period of said single frequency signal and a second information signal which is different from said first information signal, comprising:

(A) reproducing means for reproducing the first information signal and said second information signal from said recording medium and outputting the reproduced signals;

(B) correcting means for performing correction of time-base variations on said second information signal reproduced by said reproducing means; and (C) correction operation control means for controlling a correction operation performed by said correcting means by using the other part of the period of the single frequency signal which is not modulated with said information among the single frequency signal of said first information signal output from said reproducing means.

2. An information signal reproducing apparatus according to claim 1, wherein said second information signal includes a video signal which contains horizontal and vertical synchronizing signals.

3. An information signal reproducing apparatus according to claim 2, further comprising synchronizing signal separating means for separating from said video signal the vertical and horizontal synchronizing signals contained in said video signal.

4. An information signal reproducing apparatus according to claim 3, wherein said recording medium includes a disk-shaped recording medium.

5. An information signal reproducing apparatus according to claim 4, wherein said reproducing means includes:

(A) rotating means for rotating said disk-shaped recording medium;

(B) reproducing head means for reproducing said first and second information signals by tracing said disk-shaped recording medium which is being rotated by said rotating means; and (C) rotation operation control means for controlling a rotating operation of said rotating means, by using at least one of the vertical synchronizing signals separated by said synchronizing signal separating means and the other part of the period not modulated with said information, among the single frequency signal of said first information signal output from said reproducing means.

6. An information signal reproducing apparatus according to claim 3, wherein said correction operation control means includes:

(A) first clock signal generating means for generating a first clock signal having a phase conforming to that of the horizontal synchronizing signal separated by said synchronizing signal separating means and that of the other part of the period which is not modulated with said information among the single frequency signal of said first information signal output from said reproducing means and having a frequency different from that of the horizontal synchronizing signal and that of said single frequency signal; and (B) second clock signal generating means for generating a second clock signal having the same frequency as that of said first clock signal.

7. An information signal reproducing apparatus according to claim 6, wherein said correcting means includes storage means for storing the second information signal reproduced by said reproducing means in synchronism with the first clock signal generated by said first clock signal generating means and for outputting the stored second information signal stored in synchronism with the first clock signal in synchronism with the second clock signal generated by said second clock signal generating means.

8. An information signal reproducing apparatus according to claim 6, wherein the frequency of the other part of the period which is not modulated with the information among the single frequency signal of said first information signal is set as a value which is an integer times that of the horizontal synchronizing signal separated by said synchronizing signal separating means.

9. An information signal reproducing apparatus according to claim 1, wherein said correction operation control means includes:

(A) first clock signal generating means for generating a first clock signal having a phase conforming to that of the other part of the period which is not modulated with said information among the single frequency signal of said first information signal output from said reproducing means and having a frequency different from that of the single frequency signal; and (B) second clock signal generating means for generating a second clock signal having the same frequency as that of said first clock signal.

10. An information signal reproducing apparatus according to claim 9, wherein said correcting means includes storage means for storing the second information signal reproduced by said reproducing means in synchronism with the first clock signal generated by said first clock signal generating means and for outputting the stored second information signal stored in synchronism with the first clock signal in synchronism with said second clock signal generated by said second clock signal generating means.

* * * * *

UNITED STATES PATENT AND TRADEMARK OFFICE
CERTIFICATE OF CORRECTION

PATENT NO. : 5,373,369
DATED : December 13, 1994
INVENTOR(S) : Ryo Fujimoto It is certified that error appears in the above-identified patent and that said Letters Patent is hereby corrected as shown below:

On the title page:
Item [30]. Insert -- [30] Foreign Application Priority Data  Aug. 31, 1987 JP Japan......SHO 62-215151 --.

Col. 2, line 42. Change "deterioration" to -- deteriorating --.

Col. 4, line 7. Change "signal" to -- signals --.

Signed and Sealed this

Sixteenth Day of May, 1995

Attest:

BRUCE LEHMAN

*Attesting Officer*      *Commissioner of Patents and Trademarks*